Sept. 27, 1960 D. W. ELAM ET AL 2,954,144
STORAGE, MIXING AND DISPENSING DEVICE
Filed Oct. 17, 1957

INVENTORS
Alexander L. Robb
Harry H. McAdam
Daniel W. Elam
John L. Morrill
BY ECKHOFF & SLICK, Attys.

A member of the firm.

United States Patent Office 2,954,144
Patented Sept. 27, 1960

2,954,144
STORAGE, MIXING AND DISPENSING DEVICE

Daniel W. Elam and John L. Morrill, San Carlos, and Alexander L. Robb and Harry H. McAdam, Redwood City, Calif., assignors, by mesne assignments, to Hiller Aircraft Corporation, a corporation of California Filed Oct. 17, 1957, Ser. No. 690,683

4 Claims. (Cl. 222—82)

This invention relates to a container, mixer and dispenser for a two-part plastic material. In many industrial applications, two-part plastics are used wherein two portions of a plastic material must be kept separated until immediately before use. The two portions are intimately mixed together and used within a short period of time. In the past, it has been necessary to provide separate storage containers for the two portions and then mix the ingredients together in the proper proportions. This operation is undesirable from several standpoints. In the first place, many such mixtures require rather critical proportions of the two components and must therefore be carefully measured or weighed out. Further, the components of such plastics are ordinarily viscous liquids, and it is not easy to dispense, measure and mix such materials.

It is therefore an object of the present invention to provide a plastic repair kit which serves as a storage reservoir for the two portions of the plastic mixture.

Another object of this invention is to provide a device wherein the two portions of the plastic mixture may be stored for long periods of time in the same container while they are physically separated from each other.

Still another object of this invention is to provide a ready-mixing device so that the materials may be rapidly and thoroughly mixed together.

Still another object of this invention is to provide a dispenser so that the plastic material, after mixing, can be readily applied to the desired place.

In the drawings forming a part of this application:

Figure 1:
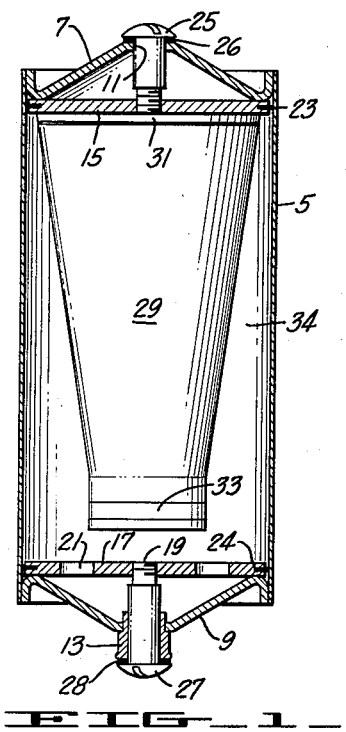
Figure 1 is a view, partly in section, of a preferred embodiment of the present invention, the parts being in a position wherein the device is stored.

Referring now to the drawings by reference characters, the mixing and dispensing device has an outer, cylindrical body portion, designated 5, having end members 7 and 9. End members 7 and 9 are preferably of somewhat conical shape, as is shown, although it will be apparent that they may be merely disks held to the ends of cylinder 5. The member 7 has a central opening 11 therethrough while the member 9 has a central opening formed by an inset sleeve 13. Within the cylinder 5 are two pistons, the first being a solid piston 15, with a threaded opening in the center thereof, while the second piston 17 has a threaded central opening 19 and a series of perforations 21 near the periphery thereof. The piston 15 is preferably provided with a sealing ring 23 while the piston 17 may or may not have a corresponding ring 24. It will later be obvious that the ring 24 is not needed for a sealing function but in many cases is desirable to prevent the piston from turning within the cylinder. As is shown in Figure 1, the device in storage is sealed by two screws designated 25 and 27. Screw 25 is provided with a gasket 26, and the screw end screws into the perforated piston 15, while screw 27 is provided with a gasket 28, and the screw end screws into the perforated piston 17. Thus, when the device is in storage, the two pistons are held in the positions shown in Figure 1, and the contents of the device are sealed from the air.

Figure 5:
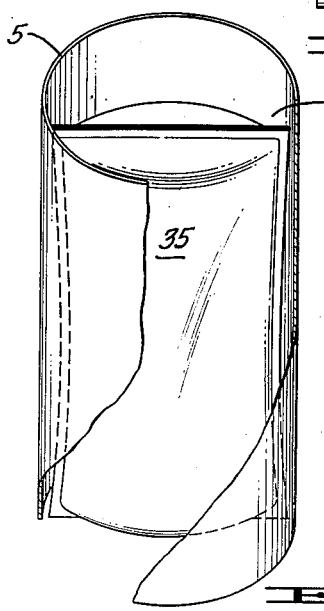
Figure 5 is a partial perspective view showing an alternate form of inner container.
Figure 4:
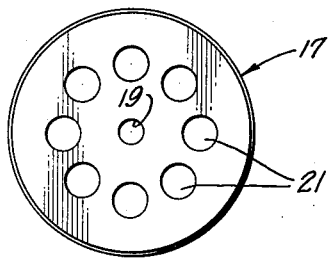
Figure 4 is a plan view of the mixing piston.

The device is primarily applicable for use with a two-part plastic mixture as has been mentioned previously. To provide for the two portions of the plastic, a bag of an easily rupturable material is located within the cylinder 5. In the embodiment shown in Figures 1 and 2, the bag is in the form of a cone 29 of a thin, easily rupturable material such as aluminum foil. The bag is closed by folding over the ends as at 31 and 33, and the larger end 31 is preferably attached to the piston 15 so that it will be accurately located within the cylinder. It is preferred that the bag be anchored within the cylinder although the device will be operative even if the inner container 29 is merely floating within the cylinder. Thus, one portion of the plastic is confined within the bag 29 while the balance of the material occupies the space 34 surrounding the bag. In the embodiment shown in Figure 5, the inner bag may or may not be fastened and is in the form of a pillow-shaped bag 35. Thus, in this embodiment a portion of the plastic mixture is within the pillow-shaped bag 35 while the balance is in the space 34 surrounding the bag.

It is believed apparent from the foregoing that a storage device has been provided wherein the two-part plastic mixture is hermetically sealed from contact with the air and wherein the two portions of the plastic can not be in contact with each other.

Figure 2:
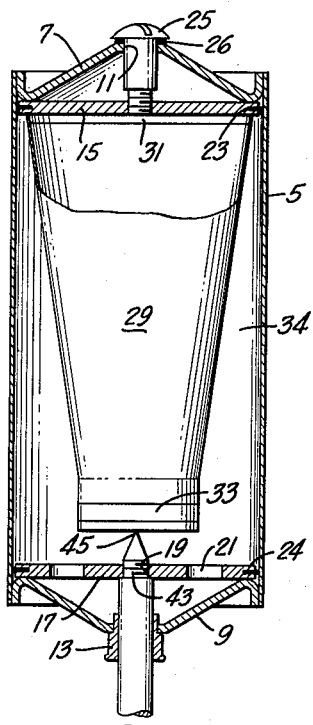
Figure 2 is a sectional view, similar to Figure 1 but showing the sealing screw removed and the mixing handle and perforator inserted in the device.
Figure 3:
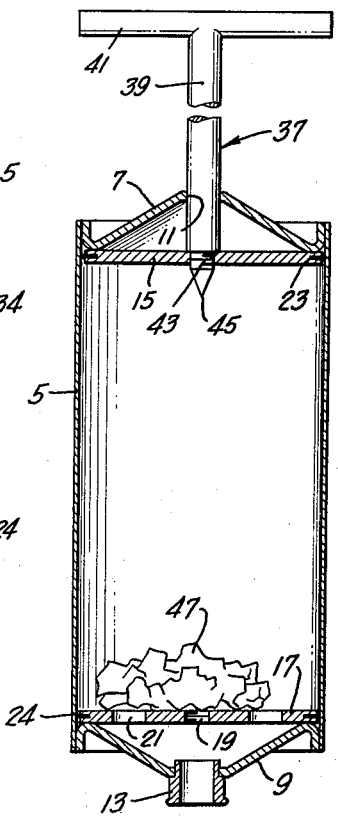
Figure 3 is a sectional view, similar to Figures 1 and 2, showing the handle inserted in the dispensing position.

In order to mix and dispense the plastic, a handle, generally designated 37, is provided. The handle 37 has a shaft 39 and a cross member 41, and the opposite end is threaded as at 43 and terminates in a sharply pointed end 45. When it is desired to mix the two portions of plastic, the screw 27 is first unscrewed from the perforated plate 17 and discarded. The handle 37 is then passed through the bushing 13 and is screwed onto the plate 17 as is shown in Figure 2. Pressure is then placed on the handle causing the plate 17 to move within the cylinder. As the sharply pointed end 45 strikes the bag 29 it causes the bag 29 to rupture, releasing the contents and allowing the contents of the inner and outer chambers to mix. The handle can then be worked vigorously back and forth several times forcing the contents through the openings 21 of the piston 17, thoroughly mixing the contents. When the contents are sufficiently mixed, the handle 37 is unscrewed from the piston 17, and the screw 25 is unscrewed from the opposite end of the piston 15 and discarded. The handle 37 is then inserted through the opening 11 and its threaded end screwed into the piston 15. The parts are thus in the position shown in Figure 3, and by pressing on the handle 37, the piston 15 is forced to move in the cylinder forcing the contents through the opening of the bushing 13. The perforated piston 17 acts like a coarse filter and retains the remnants of the foil bag 47 so that the remnants of the bag do not clog the opening at 13 as the contents are discharged.

Although the invention has been described for use with a two-part plastic, it is obvious that it is applicable to any situation wherein one wishes to store, mix and dispense a multiple component mixture.

Many variations are possible without departing from the spirit of this invention. For instance, the inner container may be made in various shapes which may or may not be held in a fixed position. Further, the container can be made of various materials, it only being necessary that the material be inert to the contents and that it be rupturable. Further, both components may be held in rupturable containers so that it is not necessary for the cylinder and ends to be made of an inert material. Several inner containers may be used if one desires to use a material having more than two components.

We claim:

1. A container and dispenser for a two component composition comprising a cylinder with first and second substantially closed ends, each of said ends having a central opening therein with removable means for closing said openings, a first piston within the cylinder adjacent the first end, said first piston having openings therein, including a central opening, a second piston within the cylinder adjacent the second end, said second piston being substantially solid, a frangible container in the cylinder containing one component of said two component mixture, the second component of said composition being within said cylinder and outside said frangible container, means whereby the removable closing means can be removed from the opening of the first closed end and a handle inserted therein and attached to said first piston whereupon said piston can be worked back and forth by means of said handle, rupturing said frangible container and thoroughly mixing the material from within the frangible container with the material outside the frangible container, and the handle then removed and means whereby the closure of the second substantially closed end can be removed, a handle inserted through said opening in said second substantially closed end and pressure exerted on said piston whereby the thus mixed contents of the container are discharged through the opening of the first end.

2. The container and dispenser of claim 1 wherein the frangible container is in the form of a metal foil cone with its larger end attached to the second piston.

3. The structure of claim 1 wherein the handle inserted in the first opening has a sharp point on its end.

4. The container and dispenser of claim 1 wherein the first piston has a threaded opening in the center thereof and wherein the handle inserted in the opening in the first end is provided with mating threads.

References Cited in the file of this patent

UNITED STATES PATENTS

| | | |
|---|---|---|
| 2,733,836 | Switzer | Feb. 7, 1956 |
| 2,768,768 | Cornell et al. | Oct. 30, 1956 |
| 2,784,791 | Austin | Mar. 12, 1957 |
| 2,831,606 | Alters | Apr. 22, 1958 |